United States Patent [19]

Thirion

[11] Patent Number: 4,489,868
[45] Date of Patent: Dec. 25, 1984

[54] LUGGAGE RACK
[75] Inventor: Paul J. Thirion, Payette, Id.
[73] Assignee: L. B. Industries, Inc., Boise, Id.
[21] Appl. No.: 569,386
[22] Filed: Jan. 9, 1984
[51] Int. Cl.³ ............................................. B60R 9/04
[52] U.S. Cl. .................................. 224/321; 224/326
[58] Field of Search ............... 280/763, 765, 769, 770; 296/37.7; 224/321, 309, 316, 317, 318, 320, 326, 327, 325, 310, 319, 323, 324, 917, 42.1; 248/503

[56] References Cited

U.S. PATENT DOCUMENTS

| Re. 26,539 | 3/1969 | Bott | 224/326 X |
|---|---|---|---|
| 2,947,566 | 8/1960 | Tower | 224/321 X |
| 3,174,536 | 3/1965 | Francis | 224/309 X |
| 4,099,658 | 7/1978 | Bott | 224/326 |
| 4,358,037 | 11/1982 | Heideman | 224/321 |
| 4,439,086 | 3/1984 | Thede | 224/310 X |

FOREIGN PATENT DOCUMENTS

| 493292 | 6/1953 | Canada | 224/42.1 |
|---|---|---|---|
| 541257 | 3/1956 | Italy | 224/321 |
| 596379 | 4/1959 | Italy | 224/320 |
| 2118501 | 11/1983 | United Kingdom | 224/310 |

Primary Examiner—Stephen Marcus
Assistant Examiner—Robert Petrik
Attorney, Agent, or Firm—Kolisch, Hartwell, Dickinson & Anderson

[57] ABSTRACT

A vehicle luggage rack is provided which includes the following components: a pair of longitudinally extending, parallel frame members, each having a first and a second end and being adapted to be fixed to a vehicle; a pair of longitudinally extending, parallel slide members, each of which is slidably mounted to and aligned with one of the longitudinal frame members adjacent the first end thereof; at least one longitudinally extending guide rail disposed parallel to the longitudinal members and being adapted to be fixed to the vehicle; a transverse rail extending between the longitudinal slide members to form a slide/transverse rail assembly, the transverse rail being slidably mounted to the guide rail so that the slide/transverse rail assembly is longitudinally slidable with respect to the longitudinal frame members and the guide rail; and apparatus for releasably fixing the position of the slide/transverse rail assembly with respect to the longitudinal frame members.

9 Claims, 10 Drawing Figures

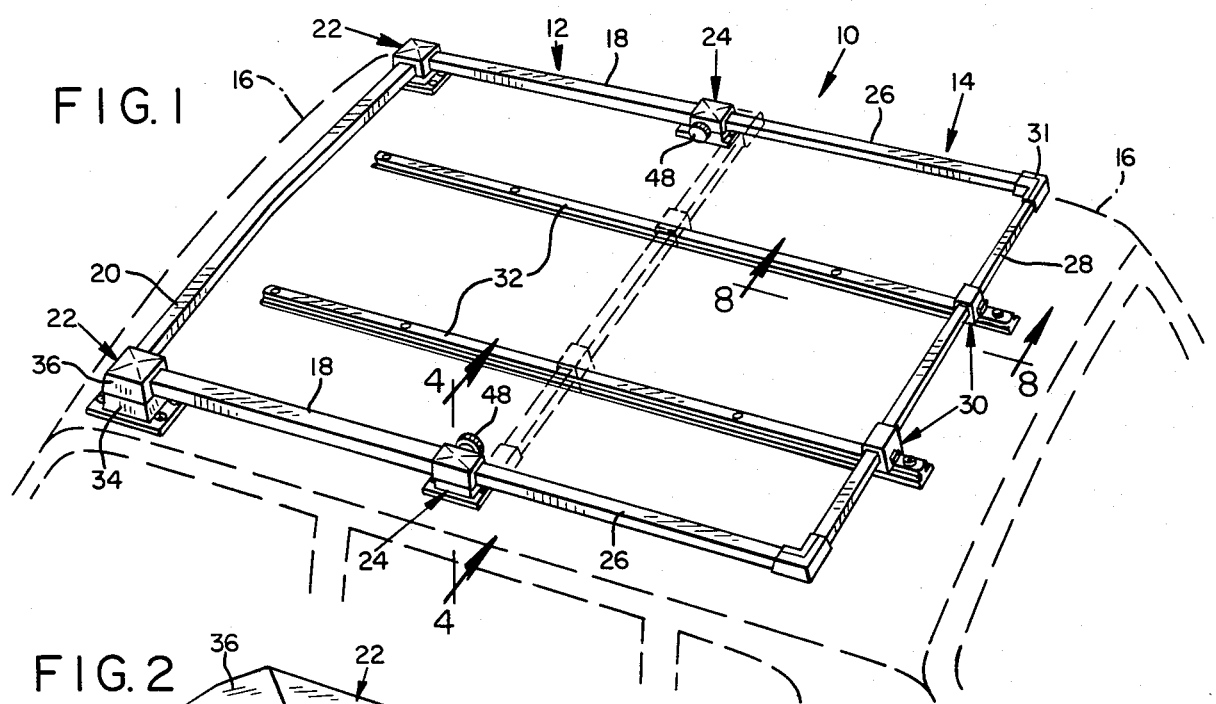
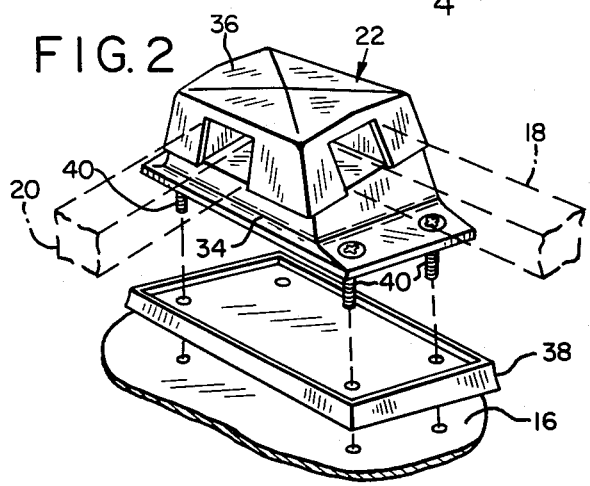
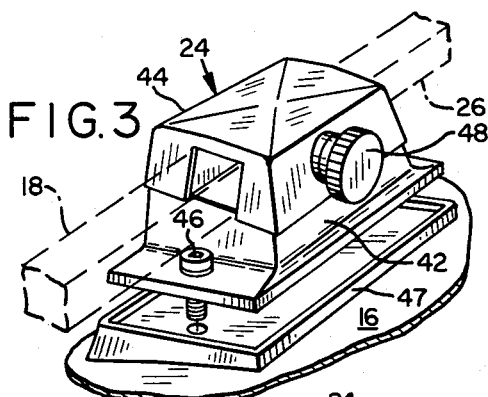
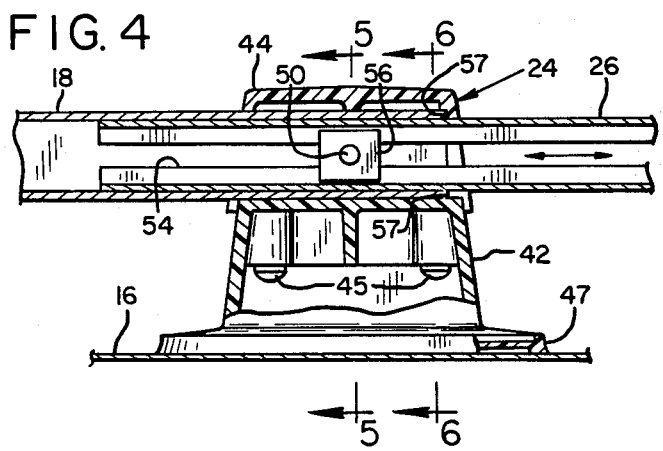
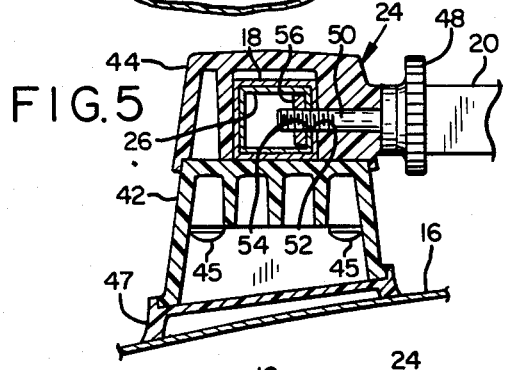
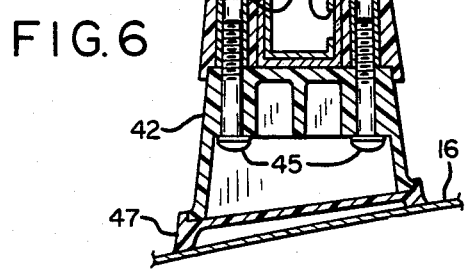

LUGGAGE RACK

BACKGROUND OF THE INVENTION

This invention relates generally to luggage racks and more particularly to a vehicle luggage rack which is adjustable to accommodate loads of different sizes.

Vehicle luggage racks have been in use for many years. Many such luggage racks are adjustable. Two such adjustable luggage racks are disclosed in U.S. Pat. Nos. 4,099,658 and Re. 26,539 to Bott. However, Bott's luggage racks are not as cosmetically attractive as they might be and therefore detract from the appearance of the vehicle. Also, conventional luggage racks are often aerodynamically inefficient and result in drag upon the vehicle, and can cause wind noise.

It is desirable that a luggage rack be easily mounted to a vehicle, either during the original manufacture of the vehicle or as an accessory added after delivery to the dealer or by the owner subsequent to sale. Another important feature of a luggage rack is that it be easily adjustable but securely fixable into one of a plurality of predetermined positions in order to accommodate loads of various sizes. It is even more desirable that the luggage rack be adjustable to an infinite number of positions. Such adjustability should be permitted by a single person having little or no expertise or tools. It is also desirable that the adjustments be accomplishable while wearing gloves or heavy mittens in order to facilitate adjustability in cold weather.

Other preferred features of a luggage rack are that the rack be strong and durable so that the life of the luggage rack is essentially that of the life of the car, and that it be capable of holding heavy loads. It is also highly desirable that the rack be lightweight and inexpensive, features that are not often combined with strength and durability.

SUMMARY OF THE INVENTION

The present invention achieves the objects noted above by providing an adjustable luggage rack of novel design. The term "luggage rack" as used herein should be understood to be a term of art, and that the invention is equally suited to carry other loads such as boxes, skis, etc. The luggage rack of this invention includes the following components: a pair of longitudinally extending, parallel frame members having first and second ends and being adapted to be fixed to a vehicle; a pair of longitudinally extending, parallel slide members, one of each of which is slidably mounted to and is aligned with each of the longitudinal frame members; a transverse rail extending between the longitudinal slide rails to form a slide/transverse rail assembly, the transverse rail having follower means thereon; at least one longitudinally extending guide rail disposed parallel to the longitudinal members in transverse alignment with the transverse rail follower means, the guide rail being adapted to be fixed to the vehicle; means for slidably mounting the transverse rail follower means to the guide rail so that the slide/transverse rail assembly is longitudinally slidable with respect to the longitudinal frame members and the guide rail; and means for releasably fixing the position of the slide/transverse rail assembly with respect to the longitudinal frame members.

It is preferable that the means for releasably fixing the position of the slide/transverse rail assembly comprises detent means mounted to each of the longitudinal frame members adjacent the first end thereof. Each of the detent means normally includes a retainer disposed within the slide member, and a bolt which threadably engages the retainer so that when the bolt/retainer assembly is tightened, the position of the slide/transverse rail assembly becomes fixed with respect to the longitudinal frame member.

The invention thus provides a vehicle luggage rack which is adjustable, is aesthetically attractive and aerodynamically efficient, and is durable but lightweight and inexpensive. Other objects, features and advantages of the present invention will become apparent upon reading the following detailed description in conjunction with the accompanying drawings.

BRIEF DESCRIPTION OF THE DRAWINGS

FIG. 1 is a perspective view of a first embodiment of the present invention, showing in solid lines the slide/transverse rail assembly adjusted to its fully enlarged position, and in phantom lines adjusted to its smallest position, the vehicle to which it is mounted also being indicated in phantom;

FIG. 2 is a perspective view of one mounting corner of the first embodiment, exploded to depict the preferred means by which the rack is mounted to the vehicle, the longitudinal and transverse frame members being indicated in phantom;

FIG. 3 is a perspective view of one of the detent/vehicle mounting means disposed adjacent a first end of one of the longitudinal frame members, the longitudinal members being indicated in phantom;

FIG. 4 is a side elevation sectional view taken along line 4—4 of FIG. 1;

FIG. 5 is an end elevation sectional view taken along line 5—5 of FIG. 4;

FIG. 6 is an end elevation sectional view taken along line 6—6 of FIG. 4;

DETAILED DESCRIPTION OF THE PREFERRED EMBODIMENT

Construction of the Preferred Embodiment

Figure 7:
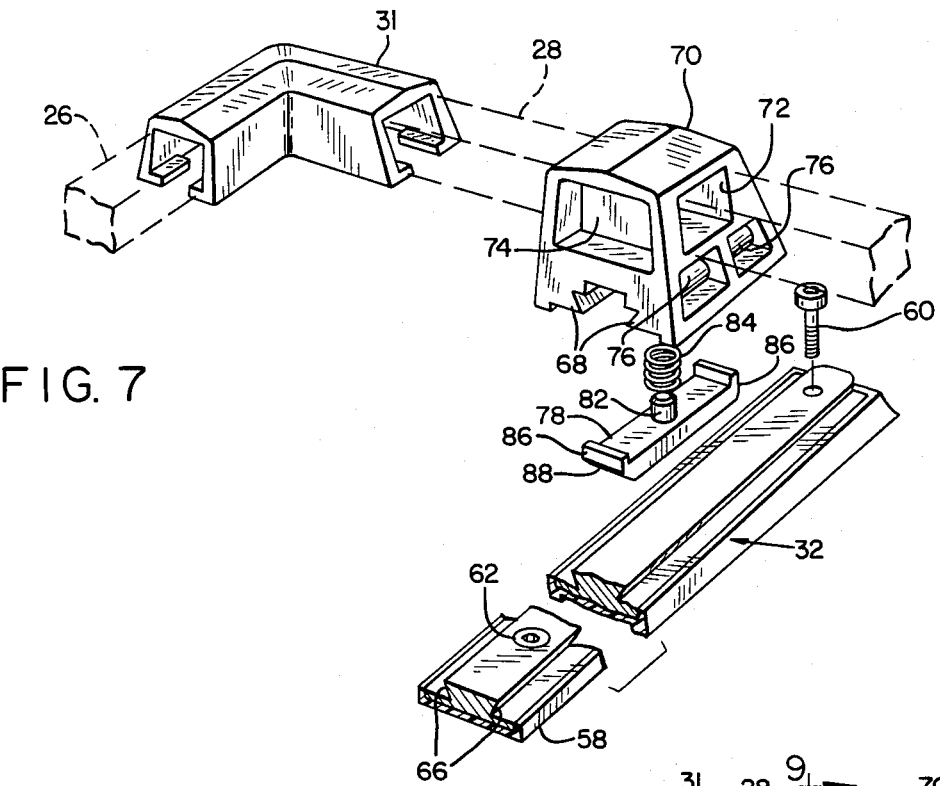
FIG. 7 is an exploded, fragmentary, perspective view showing the transverse rail follower means of the first embodiment, the transverse rail and the longitudinal slide member being indicated in phantom.

The objects of the present invention are particularly well-achieved when the invention takes the form of the embodiment depicted in FIGS. 1-10. The luggage rack, which is generally indicated in FIG. 1 with the numeral 10, consists essentially of a frame assembly 12 and a slide/transverse rail assembly 14. Frame assembly 12 is adapted to be rigidly fixed to a vehicle, indicated in phantom at 16, and includes a pair of longitudinally extending frame members 18 a transversely extending frame member 20 mounted between so-called first ends of the longitudinal frame members, a pair of frame mounting means 22 mounted to so-called second ends of the longitudinal frame members, and a pair of detent/frame mounting means 24, mounted adjacent the first ends of the longitudinal frame members. Slide/transverse rail assembly 14 includes a pair of longitudinally extending slide members 26, and a transverse rail 28 which extends between the slide members adjacent the ends which are remote from frame assembly 12. Transverse rail 28 has so-called follower means 30 mounted to it, which adapts slide/transverse rail assembly 14 to slidably mount to a pair of longitudinally extending guide rails 32.

Referring now in more detail to frame assembly 12, longitudinal and transverse frame members 18 and 20 are typically constructed of aluminum or other lightweight, rigid material, and are normally square in cross-section. For aesthetic reasons, it may be appropriate in certain applications to form the frame members in a rectangular or even round cross-section.

Frame mounting means 22 which mounts longitudinal and transverse frame members 18 and 20 to vehicle 16 is shown in some detail in FIG. 2. As depicted, frame mounting means 22 includes a footing 34 which supports the frame members at a position raised above the surface of the vehicle, a cap 36 which fits over the perpendicular intersection of the longitudinal and transverse frame members, a mounting pad 38, and a plurality of fasteners such as screws 40 which rigidly mount frame mounting means 22 to the vehicle 16. Each of the screws 40 would typically be engaged by a nut from below, but such nuts do not show in the drawings. Cap 36 is preferably mounted to footing 34 from the underside by a plurality of screws which do not appear in FIG. 2 and which are concealed when frame mounting means 22 is affixed to vehicle 16. Mounting pad 38 is typically formed of rubber or some other resilient material which will minimize damage to vehicle 16 and will allow for expansion and contraction of screws 40 as the seasons change. Although not depicted, the preferred construction is to include a single screw 40 at each end of footing 34. The four depicted holes are normally included in mounting pad 38, but only two of the holes are used at any particular time. This is so that a single construction of footing 34 and mounting pad 38 may be used for each side of the luggage rack 10. That is, by merely reversing the footing 34 and by inserting two screws 40 through the other of the two holes in mounting pad 38, a footing may be adapted for use on either side of luggage rack.

As shown in FIGS. 4-6, longitudinal slide members 26 preferably telescope into longitudinal frame members 18. This provides an effective, slidable but sturdy mounting between slide members 26 and longitudinal frame members 18 and facilitates an effective but simple detent/frame mounting means 24 which permits the infinite, slidable adjustment of slide/transverse rail assembly 14 with respect to frame assembly 12. This accommodates luggage rack 20 to carry luggage or other loads of a wide variety of sizes and shapes.

One of the detent/frame mounting means 24 is depicted in FIGS. 3-6. The two detent/frame mounting means are of identical design, each consisting essentially of a footing 42, a cap 44 which, like cap 36, is mounted such as by screws 45 extending upwardly from the underside of footing 42. Footing 42 is typical identical in construction to footing 34. Fastening means such as screws 46 (only one of which appears in the Figs.), and an adjustment control knob 48 are also included. Nuts (not shown) would typically be threaded onto screws 46 from below. A rubber or vinyl pad 47 is positioned between footing 42 and vehicle 16 to minimize damage to vehicle 16 and allow for expansion and contraction of screws 46. As with footings 34 and 42, mounting pads 38 and 47 are preferrable interchangable. For this reason, it is preferred that four screw holes be included in mounting pad 47 rather than merely the two which appear in the figures.

As shown best in FIG. 5, control knob 48 is mounted on the end of a threaded shaft 50 which is mounted to permit rotation within cap 44. Control knob 48 includes an engagement means which has not been depicted which rotatably mounts the knob with respect to cap 44, and which prevents inward or outward movement of the knob with respect to the cap. This engagement means typically takes the form of a conventional collar structure.

Threaded shaft 50 extends through a circular aperture 52 in the longitudinal frame member 18 and through a longitudinally extending slot 54 defined along the inner side of the longitudinal slide member 26. An enlarged nut or retainer 56 is disposed within longitudinal slide member 26, threadably mounted onto shaft 50, and is sized such that it is engaged by the inner walls of the slide member so that rotation of the retainer is not permitted within the slide member. Thus, rotation of control knob 48 will cause the retainer to move inwardly and outwardly, or to the right or the left in FIG. 5, thereby tightening or loosening the engagement of the walls of the longitudinal frame and slide members by the detent/frame mounting means 24. As depicted at best in FIG. 4, the presence of longitudinal slot 54 permits slide members 26 to slide into and out of longitudinal frame member 18 once retainer 56 has been loosened by control knob 48, thereby permitting infinite adjustment of slide/transverse rail assembly 14 with respect to frame assembly 12. This first end of longitudinal frame members 18 abuts detent/frame mounting means 24 at a shoulder 57 to fix the longitudinal frame members in position.

Figure 8:
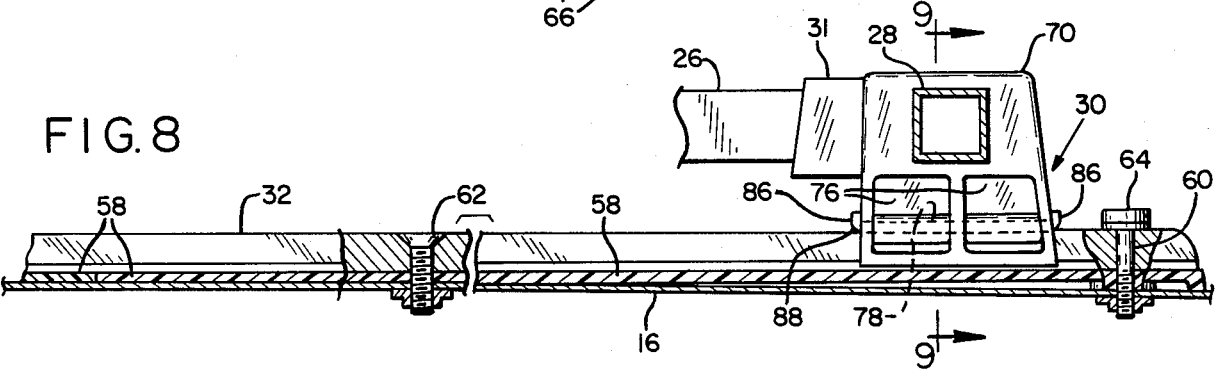
FIG. 8 is a fragmentary, side elevation sectional view taken along 8—8 of FIG. 1.
Figure 10:
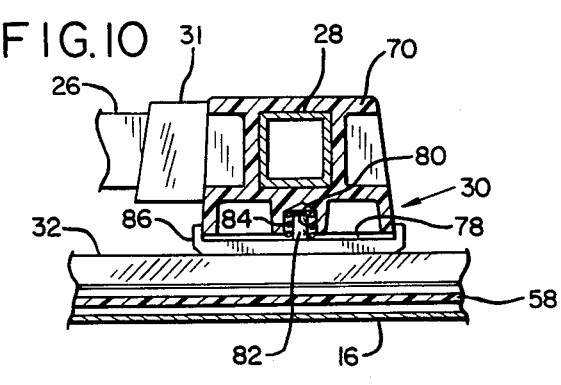
FIG. 10 is a side elevation sectional view taken along line 10—10 of FIG. 9.

Guide rails 32 are provided to guide the longitudinal displacement of slide/transverse rail assembly 14 and to maintain the alignment of that assembly with respect to frame assembly 12. Guide rails 32 are typically formed of extruded vinyl, but a wide variety of other materials may be alternatively used. While a pair of guide rails 32 is shown in the depicted embodiment, it is possible in certain applications that a single guide rail, or three or more guide rails may be advisable in place of the two which are depicted. Each depicted guide rail 32 includes a resilient guide rail mounting pad 58 which, like the other mounting pads 38 and 47, is provided to minimize damage to vehicle 16 and allow for expansion and contraction of guide rail fasteners such as screws 60 and 62. A nut is usually threaded onto each of the screws 60 and 62 from below, as depicted in FIG. 8. Also, as shown in FIG. 8, the end-most screw 60 includes an upwardly extending head 64 to provide a stop against which transverse rail follower means 30 abuts to prevent over-extension of slide/transverse rail assembly 14. All of the other mounting screws 62 are countersunk to provide a smooth surface over which the follower means 30 passes.

The tongue-and-groove type cooperation of follower means 30 and guide rails 32 is best shown in FIGS. 7-10. Specifically, each guide rail 32 includes a pair of upwardly and outwardly flaring shoulders 66 which are encompassed by complementing, downwardly and inwardly projecting portions 68 of each of the follower means 30. This prevents dislodgment of follower means 30 from guide rail 32 unless the follower means is slid off the end of the guide rails. As noted above, such sliding off is impossible when headed screw 60 is in place adjacent the end of each of the guide rails. As shown in FIG. 1, guide rails 32 typically extend for most of the length of the luggage rack 10, although they really are only utilized as guide rails for approximately half of their length. They extend substantially all the way to transverse frame member 20 to support the luggage or other load above vehicle 16 and thereby reduce the possibility of scuffing or scratching of the vehicle surface, and to ensure stability to the entire length of each of the guide rails.

Referring again to each of the follower means 30, a body 70 is included, of which downwardly and inwardly projecting portions 68 are a part. The upper part of body 70 includes an open portion 72 through which transverse frame member 20 is adapted to extend. Additional openings 74 and 76 are provided in the upper and lower parts of body 70, respectively, but are not critical and are merely provided to reduce the amount of material utilized, to lighten the structure, and for casting purposes.

Figure 9:
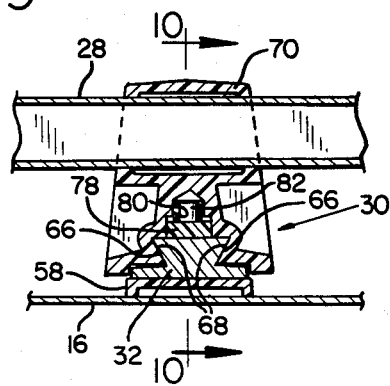
FIG. 9 is an end elevation sectional view taken along line 9—9 of FIG. 8.

A resilient mounting is provided between follower means 30 and each of the guide rails 32 by a skid shoe 78 which is mounted to the follower means body 70 as shown best in FIG. 9. A cylindrical recess 80 is provided in the underside of body 70 to receive a substantially cylindrical stem 82, around which is disposed a spring 84. Each skid shoe 78 is symmetrical, having a pair of vertically extending ends 86, the rear portion of which is provided to abut head 64 of abutment screw 60. A beveled portion 88 is provided below the vertically extending ends 86 so that the skid shoe 78 will ride over minor debris such as ice which may from time to time accumulate on guide rails 32. By providing this resilient mounting, it is less likely that slide/transverse rail assembly 14 will become misaligned or will jam as it is being adjusted. Also, it permits a certain amount of clearance to be designed into the fit between upwardly and outwardly extending shoulders 66 and downwardly and inwardly projecting portions 68. This further eases the adjustment procedure and reduces the possibility that minor deposits on guide rails 32 will cause jamming of follower means 30 in guide rails 32.

Luggage rack 10 is normally mounted so that the frame assembly 12 is forwardly facing on vehicle 16 while slide/transverse rail assembly 14 is rearwardly facing. However, because the luggage rack may be faced the opposite direction as well, this feature has not been stressed herein.

Operation of the Depicted Embodiment

To use luggage rack 10, it will often be necessary to first adjust the size. To do this, each of the control knobs 48 is rotated in a counterclockwise direction, thereby loosening the hold which each retainer 56 has on the inner walls of the slide members 26 and the longitudinal frame members 18. Due to the size of control knobs 48, this may be done while wearing large gloves or mittens and does not require the use of tools. Once control knobs 48 have been loosened, the entire slide/transverse rail assembly may be displaced in a longitudinal direction either toward or away from frame assembly 12, thereby making luggage rack 10 smaller or larger. Slide/transverse rail assembly 14 will not slide off the end of guide rails 32 because skid shoes 78 would first come into abutment with the heads 64 of abutment screws 60. Because there is some clearance built into the fit between flange shoulder 66 and downwardly and inwardly projecting portions 68 of follower means 30, it is relatively easy to move slide/transverse rail assembly 14 along guide rails 32, and may be done so by a single person pulling or pushing on transverse rail 28.

Once slide/transverse rail assembly 14 has been positioned as desired, control knobs 48 are tightened so that each retainer 56 is drawn in against the inner walls of slide members 26 and longitudinal frame members 18, thereby securely fastening these members with respect to each other. In this fixed position, transverse frame member 20 and transverse rail 28 are elevated with respect to vehicle 16, and therefore provide end abutment for the load.

With slide/transverse rail assembly 14 fixed, a load may be placed onto guide rails 32 which protect vehicle 16 from scuffing or scratching. Alternatively, the load may be mounted onto vehicle 16 prior to adjustment of the luggage rack 10, such as when the slide/transverse rail assembly 14 is desired to be tightened against the load. This is not always possible with conventional designs which often require the use of tools to tighten inwardly facing fasteners which may be obstructed by the load. Control knobs 48 are usually accessible even when a load is in place.

While luggage rack 10 has been shown to be positioned on the roof of a vehicle, it should be appreciated that it is equally suited for mounting to the trunk lid of the vehicle. With additional transversely extending components, luggage rack 10 can be easily transformed into a ski rack. These and other changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

It is claimed and desired to secure by Letters Patent:

1. A vehicle luggage rack comprising:
   a pair of longitudinally extending, parallel frame members, each having a first and a second end and being adapted to be fixed to a vehicle;
   a pair of longitudinally extending, parallel slide members, each of which is slidably mounted to and aligned with one of said longitudinal frame members adjacent said first end thereof;
   a transverse rail extending between said longitudinal slide members to form a slide/transverse rail assembly, said transverse rail having follower means thereon;
   at least one longitudinally extending guide rail disposed parallel to said longitudinal members in transverse alignment with said transverse rail follower means, said guide rail being adapted to be fixed to the vehicle;
   means for slidably mounting said transverse rail follower means to said guide rail so that said slide/transverse rail assembly is longitudinally slidable with respect to said longitudinal frame members and said guide rail; and
   means for releasably fixing the position of said slide/transverse rail assembly with respect to said longitudinal frame members.

2. The luggage rack of claim 1, wherein said means for releasably fixing the position of said slide/transverse rail assembly comprises detent means mounted to each said longitudinal frame member adjacent said first end thereof.

3. The luggage rack of claim 2 wherein each of said longitudinal slide members is telescopingly mounted with respect to one of said longitudinal frame members.

4. The luggage rack of claim 3 wherein each said slide member includes a longitudinally extending slot defined therein, and each said detent means comprises a threaded retainer disposed within each said slide member, and a bolt which passes through said slot and which threadably engages said retainer so that rotation of said bolt in a first direction tightens said retainer against a wall of said slide member to fix the position of said slide/transverse rail assembly with respect to said longitudinal frame members, and rotation in a second direction loosens said retainer, thereby permitting said slide/transverse rail assembly to slide with respect to said longitudinal frame members.

5. The luggage rack of claim 1, further comprising abutment means disposed between said longitudinal frame members for providing an abutment surface against which articles mounted in the luggage rack are adapted to be disposed.

6. The luggage rack of claim 5, wherein said abutment means comprises a transverse frame member extending between said second ends of said longitudinal frame members.

7. A vehicle luggage rack comprising:
a pair of longitudinally extending, parallel frame members having first and second ends;
means for affixing said longitudinal frame members to a vehicle;
a transverse frame member extending perpendicularly between and fixed to said second ends of said longitudinal frame members;
a pair of longitudinally extending, parallel slide members, one of each of which is slidably and telescopingly mounted within each of said longitudinal frame members adjacent said first end thereof, each said slide member defining a longitudinally extending slot therein;
a pair of transversely spaced, longitudinally extending guide rails disposed between and parallel to said longitudinal members;
a transverse rail extending between and fixed to said longitudinal slide rails adjacent the ends remote from said longitudinal frame members to form a slide/transverse rail assembly, said transverse rail including follower means for slidably engaging said guide rails so that said slide/transverse railing assembly is longitudinally slidable along said longitudinal frame members and said guide rails; and
slide rail detent means mounted adjacent said first end of each of said longitudinal frame members, said detent means comprising a retainer disposed within each said slide member, and a bolt which passes through said slot and which threadably engages said retainer so that rotation of said bolt in a first direction tightens said retainer against a wall of said slide member to fix the position of said slide/transverse rail assembly with respect to said longitudinal frame members, and rotation in a second direction loosens said retainer, thereby permitting said slide/transverse rail assembly to slide with respect to said longitudinal frame member.

8. The luggage rack of claim 7 wherein said guide rails include longitudinally extending, flared shoulders, and said follower means includes longitudinally extending, inwardly directed portions which encompass said flared shoulders of said guide rails to prevent substantial relative displacement between said guide rails and said follower means in direction other than the longitudinal direction of sliding.

9. The luggage rack of claim 8 wherein said follower means includes spring biasing means for biasing said follower means away from said guide rail.

* * * * *